Figure 1:
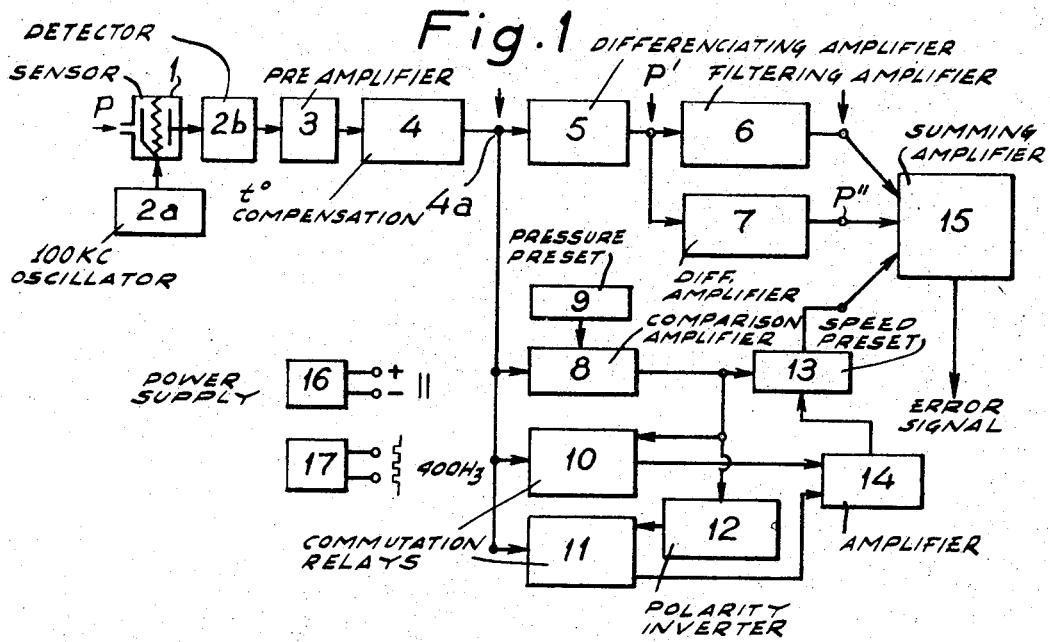

United States Patent [19]
Ricaud

[11] 3,728,955
[45] Apr. 24, 1973

[54] METHOD AND DEVICES FOR REGULATING THE PRESSURE AND ITS RATE OF VARIATION IN A CHAMBER

[75] Inventor: Pierre Ricaud, Toulouse, France

[73] Assignees: Societe Nationale Industrielle Aerospatiale, Paris; Semca Societe Anonyme des ateliers Semca, Toulouse (Haute Garonne), both of France

[22] Filed: Feb. 2, 1971

[21] Appl. No.: 111,925

[52] U.S. Cl. ................................................98/1.5
[51] Int. Cl. .............................................B64d 13/04
[58] Field of Search...........................................98/1.5

[56] References Cited

UNITED STATES PATENTS

| | | |
|---|---|---|
| 3,364,837 | 1/1968 | Schooling................................98/1.5 |
| 3,373,675 | 3/1968 | Best.........................................98/1.5 |
| 3,375,771 | 4/1968 | Balcom ...................................98/1.5 |
| 2,983,211 | 5/1961 | Andersen................................98/1.5 |
| 3,141,399 | 7/1964 | Andersen................................98/1.5 |
| 3,152,534 | 10/1964 | Molloy...................................98/1.5 |

*Primary Examiner*—Meyer Perlin
*Attorney*—Waters, Roditi, Schwartz & Nissen

[57] ABSTRACT

A method and devices for regulating the pressure of a compressible fluid in a chamber located in an atmosphere in which the pressure is variable, wherein a single pressure sensor inside the chamber is associated with electronic differential calculus means for generating an error signal and, thereafter, after summing said error signal with a repeater signal of the position of a valve for discharging said compressible fluid from said chamber, which chamber is continuously supplied with fluid by conventional means, a signal for actuating said valve.

14 Claims, 4 Drawing Figures

METHOD AND DEVICES FOR REGULATING THE PRESSURE AND ITS RATE OF VARIATION IN A CHAMBER

The technical province of this invention is that of pressure regulation in experimental chambers or aircraft cabins.

Presently existing pressure-regulating devices for pressure chambers or for chambers to be pressurized such as aircraft cabins, differ primarily in the type of circuits they utilize. Some use pneumatic circuits, others electrical circuits, other still electronic circuits, or else hybrid circuits comprising at once pneumatic, electrical and electronic components. It is therefore possible to categorize such devices according to the types of circuit used.

It would also be possible to categorize them according to whether the regulating system controls the air intake or discharge means. Such a classification would be much more general and would disregard differences in the circuits, the more so as certain devices are capable of applying the regulating action to either the intake or the discharge means. Further, almost all the latest designs use discharge valves.

Devices which use only pneumatic circuits comprise numerous conduits and flow-processing circuits requiring accurate, costly and heavy mechanical parts. Moreover, the conduits have a non-negligible weight and are subject to condensation and icing phenomena and may occasionally burst. As a rule, these systems utilize a plurality of aneroid-type measuring means. However, aneroids go out of adjustment easily and are sensitive to changes of temperature and to vibration. They have poor reliability as accurate and continuous measuring means. These measuring means are designed to evaluate the pressures within or without the cabin, the rate of variation of the pressures, and the difference in pressure inside and outside the cabin.

Further, pneumatic processing circuits such as the the amplifiers require to be supplied with air at stabilized pressure. This supply is usually provided by a separate compressor followed by a pressure-reducing valve. The various elements are heavy and liable to failure.

It is difficult with such systems to achieve linear regulation and to anticipate variations in pressure outside the cabin.

The devices which utilize at once electrical, electronic and pneumatic components are very complex. Like those referred to precedingly, they require a source of air at stabilized pressure, heavy and delicate mechanical parts, a plurality of aneroid-type sensors and somewhat heavy electromechanical components. The quality of the regulation achieved is better and adjustments of the system can be more flexible.

These devices can be regarded as representing the intermediate evolutionary stage between devices comprising uniquely pneumatic components and those comprising uniquely electronic components. Additionally, they can control a plurality of valves, the positions of which can be remote-displayed, but on the other hand they include many components sensitive to vibration and temperature and are therefore of doubtful reliability. Moreover they use many moving mechanical parts liable to bind and to undergo wear.

Devices which use only electronic circuits offer numerous advantages : high reliability of the electronic components, flexibility and fidelity of the adjustments, light weight, almost complete imperviousness to vibration and temperature variations, no maintenance, low power consumption, total elimination of pressurized air conduits, compactness, ease of installation and connection, the possibility of anticipating pressure variations, of controlling a plurality of valves without complicated circuitry and of remote-monitoring the same, thereby notably improving overall safety.

The present invention includes a method and devices for regulating the pressure in a chamber or an aircraft cabin which overcome the disadvantages of the above-mentioned devices.

The invention accordingly includes a regulating method whereby the pressure inside a measuring chamber or an aircraft cabin is measured by a single sensor which gives an electrical translation of the value of said pressure, and this translation is processed by double electronic differentiation in order to generate an error signal which is smoothed and corrected subtractively by a preset rate of variation signal and additively by a signal representing the mean value of the rapid rates of variation of said pressure, said error signal being compared with a corrected signal representing the position (s) of single or multiple discharge valve (s) whereby to deliver a control signal applied to a possibly pneumatically assisted actuating motor of such valve(s).

It is thus possible to obtain regulation of the pressure of a compressible fluid within an experimental chamber or an aircraft cabin subjected externally to a pressure which may itself be variable, the regulation being effected at values which can be adjusted at will and with the possibility of changing from one pressure to another at the desired adjustable or possibly constant rate.

Such regulation is effected by operating on at least one discharge valve by modifying its degree of aperture, the supply to the chamber in question being assured by conventional means.

The sensing function fulfilled by a single friction-less sensor results in the delivery of an electrical signal which is preferably proportional to the pressure in question. This electrical signal is used in various electronic circuits which deliver signals representing first and second derivatives of the pressure within the chamber and a signal designed to correspond to a smoothed rate of pressure variation dependent on the preset pressure, on the rate of variation thereof and on the actual pressure.

The invention further includes devices for performing the above-disclosed method, which devices notably include a circuit for measuring and generating an error signal, a circuit for generating a signal for actuating a valve and for repeating the position thereof, and a power circuit for using the actuating signal applied to at least one valve.

In a specific form of embodiment, each valve is provided with a frictionless inductive sensor which delivers a valve position feedback signal which, subsequent to filtering, is added, together with its derivative signal constituting a dampening term, to the error signal.

In a preferred embodiment, the power stage is formed in an electropneumatic servo actuated valve assembly driven by a torque motor.

In another alternative embodiment, the power stage is formed by a modulator which is connected via an amplifier to a control winding of a two-phase motor that actuates a valve and its position sensor directly through mechanical reduction gear.

In the above preferred embodiment, in which the valve is provided with a pneumatic servo-control, the latter is operated by an arrangement which, as a function of the external pressure and the pressure within the chamber, produces an intermediate pressure equal to the internal pressure less a constant, and in such cases it is preferable to associate to a valve of this kind positive opening and closing means thereof whereby to complementarily meet the requirements of full opening when ventilating the chamber, with instantaneous return to regulated control of the valve by releasing the movable element thereof and the positive-acting driving element, and for latched valve closure in the event of accidental immersion in water.

The present invention is equally applicable to the fields of aircraft experimentation and operation.

The description which follows with reference to the accompanying non-limitative exemplary drawings will give a clear understanding of how the invention can be carried into practice.

The device as a whole includes a plurality of main circuits, to wit:

1. A measuring and error signal generating circuit, shown more particularly in FIG. 1.
2. A valve control and valve position repeater circuit shown in FIG. 2.
3. A power circuit for utilizing the control signal, diagrammatically illustrated in FIG. 3 by way of a first embodiment.

Figure 4:
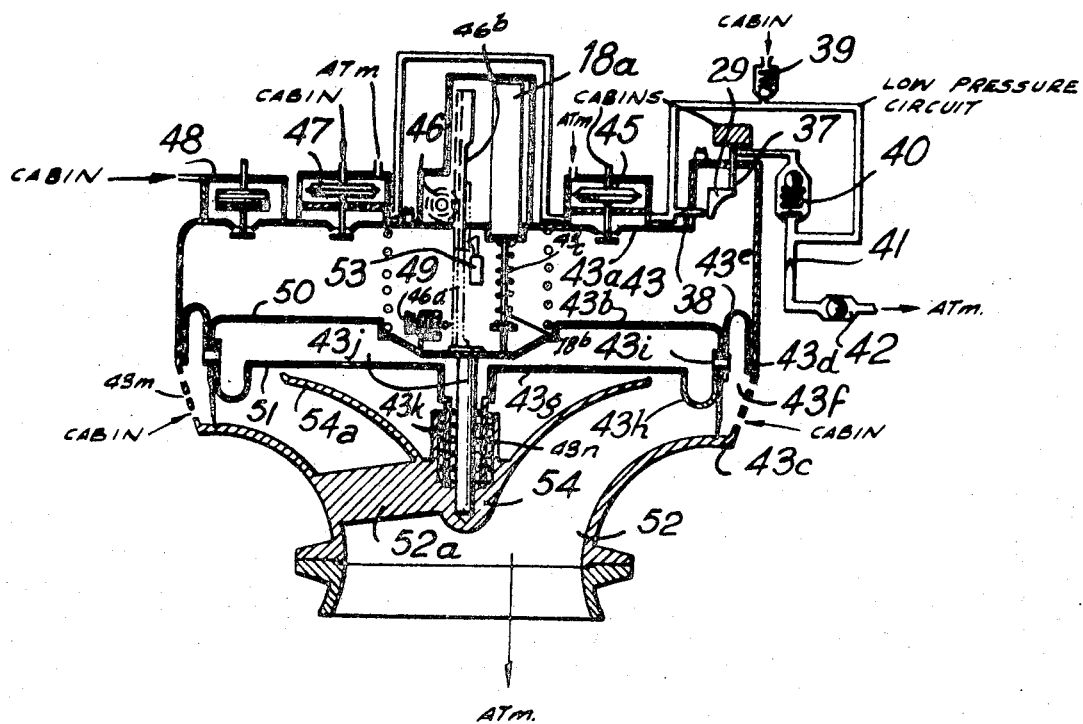

FIG. 4 is a sectional view of a valve with its auxiliaries and its connections to the measuring and control circuits and the pressure takeoffs, in accordance with a second form of embodiment.

As shown in FIG. 1, the measuring and error signal generating circuit includes a pressure sensor 1 subjected to the pressure inside a chamber and delivering the electrical signal proportional thereto.

A sensor of a type well-known per se, such as one of the frictionless membrane type, can function on the differential electrical capacitance principle. It can be made to modulate a current which is delivered to it at a frequency of 100 kHz by an oscillator 2a to which it is associated.

The electrical output from this sensor is connected to a detector 2b which is in turn connected to a pre-amplifier 3, whereby the latter receives a signal proportional to the pressure affecting sensor 1, which pressure is that prevailing inside a chamber to which said sensor is connected.

Pre-amplifier 3 is electrically connected to a circuit 4 for providing a sensor temperature compensation, the output of circuit 4 extending up to a connection point 4a.

Instead of a differential electrical capacitance type sensor, recourse could be had to a frictionless membrane-type pressure sensor, in which the membrane has strain-gauges electrically connected to form a bridge built thereinto. The strain-gauge bridge can be fed with direct current at approximately 10 milliamperes whereby to deliver to pre-amplifier 3 a signal proportional to the pressure to be measured. In such cases circuit 4 could possibly be dispensed with and the output from pre-amplifier 3 could be connected directly to connection point 4a.

Many other types of sensors may be used apart from the two examples cited hereinabove, provided that they are capable of delivering an electrical signal representing a pressure and preferably one proportional thereto.

Connection point 4a is connected to the input of a differentiating amplifier 5, to the input of a comparison amplifier 8 and to the inputs of two switching relays 10 and 11.

The output from amplifier 5 is connected to the input of a filtering amplifier 6 for integrating rapid variations and to the input of a differentiating amplifier 7.

The comparison amplifier has its output connected to switching relay 10, to a polarity reverser 12, itself connected to switching relay 11, and to the input of a rate presetting circuit 13.

The outputs of the two switching relays 10 and 11 are connected to the parallel inputs of an amplifier 14 the output of which is connected to a second input of rate presetting circuit 13.

The outputs from amplifier 6, amplifier 7 and rate presetting circuit 13 are connected to the three inputs of a summing amplifier 15 whose output provides an error signal. Reference numerals 16 and 17 designate 400-cycle and direct-current power supplies respectively.

Comparison amplifier 8 delivers a constant signal the polarity of which is dependent on a comparison made between the signal reaching the point 4a and a DC signal preset into pressure presetting circuit 9.

The signal issuing from comparison amplifier 8 is distributed to switching relay 10, to the polarity reverser 12 controlled thereby and to the rate presetting potentiometric circuit 13, whereby the pressure signal issuing either from switching relay 10 or switching relay 11 is applied to amplifier 14 which accordingly produces a pressure signal together with the algebraic sign thereof. This pressure signal is added to the signal issuing from amplifier 8 in the rate presetting potentiometric circuit 13.

The signals issuing from circuits 6, 7 and 13 are directed together into summing amplifier 15 whereby to enable it to generate said error signal.

Figure 2:
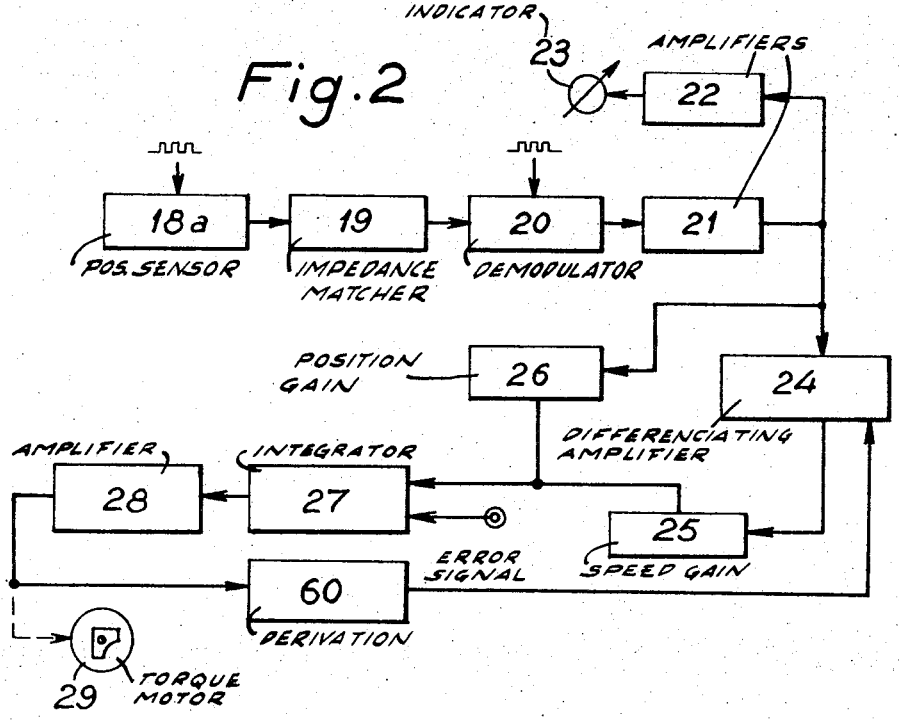

The circuit for controlling the valve and repeating its position, shown in FIG. 2, comprises a summing amplifier input 27 through which the error signal from amplifier 15 is injected into said amplifier 27. Via a second input, amplifier 27 further receives the summed signals issuing from the rate-gain and position-gain adjustable potentiometric circuits 25 and 26. The output from amplifier 27 is connected to the input of a control amplifier 28 which delivers a control signal to a torque motor 29 for driving a valve/electropneumatic amplifier compound to be described hereinafter, or to any other convenient valve drive motor.

The position repeating circuit comprises a position sensor 18a sensitive to the position reached by a valve to which more detailed reference will be made later. This sensor is provided with a 400-cycle alternating electric current supply and delivers at its output an electrical signal of the same frequency but which is amplitude-modulated proportionally to the displacement of said valve. This signal passes through an impedance matcher 19 before being delivered to a demodulator 20 which extracts the modulation from the 400-cycle carrier frequency, said modulation being symmetrical and synchronous. The modulation from the demodulator output is applied to the input of a low-pass filter-forming position amplifier 21, which filter is designed to smooth the signal by cutting off the frequencies above 80 cycles per second.

The output from amplifier 21 is connected, firstly, to a dual-sensitivity position-indicating amplifier 22 whereby to expand the scale of the small signals corresponding to small valve openings, which amplifier controls a visual indicator 23, secondly to a position-gain potentiometric circuit 26, and thirdly to a position-differentiating amplifier 24 which is in turn connected to potentiometric circuit 25, thereby to supply a damping signal to summing amplifier 27.

A differentiating cell 60, the input of which is connected to the output of amplifier 28, receives in parallel the control signal. The output of cell 60 is connected to the input of amplifier 24, at a point beyond the differentiating circuit thereof. Thus amplifier 24 amplifies the derivative signal of the control signal without applying any further differentiation thereto. This circuit provides an electrical damping on the motions of the valve motor when they are more rapid than those of the valve, particularly in cases where a combined valve/electropneumatic amplifier device is used. It further allows of augmenting the useful life of the motor by limiting its operation when the latter becomes unnecessary because of the response time of the valve.

This repeating circuit is thus by-passed for the same reason by the potentiometric circuit 26, and its purpose is to stabilize the overall condition of the device whereby to impart the desired linearization and progressiveness to the control system.

Figure 3:
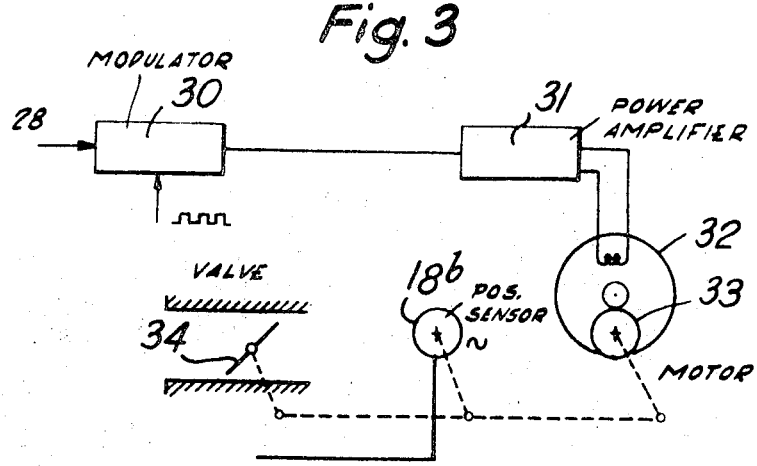

As shown in FIG. 3, the control signal from the output of amplifier 28 can be used to control any conventional valve, with or without additional amplification of the signal.

The circuit shown in FIG. 3 is relevant to the control of an electric butterfly-valve, wherein the signal from amplifier 28 is applied to the input of a modulator 30 supplied with alternating current at 400 Hz. The modulated signal of this frequency is applied to a power amplifier 31 tuned to said frequency and the output thereof is electrically connected to the control winding of a two-phase motor 32. Via reduction gear 33, the output shaft of motor 32 drives both the spindle of valve butterfly 34 and a circular inductive sensor 18b which delivers a valve position repeating signal to said impedance matcher 19 shown in FIG. 2. In this embodiment, the power stage of the device is formed by power amplifier 31.

In the embodiment of FIG. 4, a combined valve/electropneumatic amplifier device is used instead of a direct mechanical drive.

In this embodiment the torque motor 29 already mentioned with reference to FIG. 2 receives the control signal from amplifier 28 and actuates a quadrant the two arms of which are respectively positioned before the jets 37 and 38 which communicate a servo-chamber 43 servo-actuated valve assembly with a pressurized chamber via jet 37 and with a low-pressure circuit via jet 38.

This low-pressure circuit communicates both with the exterior and the interior of a pressurized chamber whereby to form the said low-pressure control means via an automatically-pressure reducing set comprising a reducing valve 40 which is caused to open by the pressure from the pressurized chamber, a jet 41, and a check-valve 42 which may be formed by a valve-housing opening to the exterior and containing a ball capable of being shifted between two opposed resting seats of which the internal one is leakproof. These elements cooperate to provide a low pressure which is at all times 25 millibars below the pressure within the pressurized chamber. This low pressure forms the source of energy for the electropneumatic amplification.

Said low pressure is adjusted by pressure reducing valve 40 so as to ensure a constant and rapid response time by the valve irrespective of the difference between the chamber pressure and the external pressure.

The servo chamber 43 is bounded on one side by a valve wall 43a and on the other by the plate of a bell-shaped valve body 43b the end-section of which cooperates with a seat 43c located on the same side as a venting venturi 52.

The bell-shaped valve body 43b is connected to the skirt 43d of the valve housing which extends from the wall 43a and surrounds body 43b by a leakproof flexible annular membrane 43e that bounds a space 43f and separates it from space 43. The space 43f surrounds the skirt of valve body 43b and communicates with the pressurized chamber through orifices in a peripheral grid. The space contained between said grid, membrane 43e and the skirt of valve 43b communicates with the space within the skirt between the valve plate and a partition wall 43g the peripheral connection for which is provided by a flexible annular member 43h, said communication being effected via a series of orifices 43i in the skirt of valve 43b.

The valve body 43b is guided by a central rod 43j which is surrounded by a bush 43k for guiding a second lifting plate 43g, and these guide means are formed by two stepped linear anti-friction bearings 43n carried in a housing 54 supported by ribs 52a of venturi 52, said housing being provided with extensions 54a the ends of which are adapted to support plate 43j at the end of its downward travel and to streamline the air passage through venturi 52.

To valve body 43b is attached a rack 46a and an actuating sliding rod 18b is urged towards said body 43b by a spring 43c. This rod 18b actuates a variable inductance type linear sensor 18a formed by a core which is movable between two windings thereby to provide a measure into which friction effects are not introduced.

The rack 46a and its mechanism 46 comprising a reduction gear are capable of being driven by a separate electric motor (not shown) responsive to separate manual or automatic valve opening and closing commands. This rack 46b cooperates with a microswitch 53 which controls energization of an electromagnet for actuating a latch 49 capable of making the rack 46b fast with the valve 43b and of operating reverser means of the direction of rotation of the separate motor whereby to drive the rack 46b upwardly. Cooperation between the rack 46b and the microswitch is 53 supplemented by a further motor travel limit microswitch not shown which arrests the motion.

At the top of the valve body is furthermore provided, in a chamber communicating with the exterior atmosphere, a capsule 45 the interior of which communicates with the pressurized chamber.

Similarly, a further capsule 47 is arranged in analogous manner. A bellows 48 with a evacuated interior volume is positioned in a chamber communicating with the pressurized cabin. Said capsules and bellows actuate valves, and the valves 45 and 46 are interposed by convenient ducts between the low-pressure circuit downstream of valve 40 and upstream of nozzle 41 and the chamber 43, while the third valve 48 communicates space 43 with the chamber surrounding bellows 48; said later chamber being in communication with cabin.

From the functional standpoint, torque motor 29 receives the regulator control signal and actuates the regulator quadrant which blocks jets 37 or 38 in varying degrees whereby to communicate servo-chamber 43 with the pressurized chamber or cabin upon opening of jet 37 or with the low-pressure circuit via jet 38. The low pressure in the latter circuit is combined from the external pressure and the pressure inside the chamber, and this combination contrived by automatic valve 40, jet 41 and check-valve 42. This results in the generation of a pressure at all times 25 millibars below the pressure within the chamber 43 and thus constitutes the source of power used for the electropneumatic amplification.

This low pressure is adjusted by overpressure valve 40, which ensures a rapid and constant valve response time irrespective of the difference between the chamber pressure and the outside pressure. In particular, the above apparatus gives very good results for the phases of transient operation when small differences exist between the chamber pressure and the outside pressure.

The valve starts to open in response to the pressure inside the pressurized chamber when there is a difference of 5 millibars with respect to the servo-pressure, and the end of valve opening occurs similarly for a pressure differential of 10 millibars.

If the current through torque motor 29 is less than 80 milliamperes, for example, jet 38 is blocked and the servo-pressure is equal to that in the pressurized chamber, whereby the valve 43b remains closed omits seat 43c.

Conversely, if the current through the motor reaches 320 milliamperes, the chamber jet 37 is blocked and the servo-pressure in chamber 43 becomes equal to the "low pressure" since jet 38 is open, whereupon the valve 43b opens; by lifting at distance of its seat 43c.

Between these two current values, it is possible o obtain any degree of valve lift for regulating purposes. Supporting the valve on linear ball-bearings ensures minimal friction and danger of binding. The degree of valve lift is measured by frictionless sensor 18a, so that the signal picked off this sensor is uniform and is applied to position indicator 23 (FIG. 2) and to the control and valve position repeating circuit, in order to correct additionally differences in valve lifts when a single error signal is applied to a multiplicity of valves and corresponding control and position repeating circuits.

The isooverpressure function, that is, the automatic limiting of the preset pressure differential between the cabin pressure and the outside pressure is performed by capsule 47. When the preset isooverpressure value is reached, the capsule lifts its valve and communicates chamber 43 with the low-pressure circuit.

Limitation of the accidental minimum chamber pressure, in the event that a valve 43b or several thereof are jammed in the open position, is a function assured in two ways on each valve:

a. The capsule or bellows 48 detects the cabin internal pressure and if the detected value is inferior to the preset value the corresponding valve of said bellows opens and communicates the pressurized chamber pressure into chamber 43. Since the passageway cross-section of this bellows valve is greater than all possible values of the cross-sections communicating with the low-pressure circuit, valve 43b recloses.

It should be noted that bellows 48 can be set to values lying between altitudes of 2400 m and 4600 m with a tolerance of plus or minus 150 m, that is to say for pressures lying between 752 and 572 mb.

b. The venturi 52 with which the above-disclosed valve is equipped offers a section such that for a given mass flow through the valve, a minimal pressure remains assured within the chamber, for conditions of sonic flow through the throat.

Limiting of the negative pressure difference between the pressure in the pressurized chamber or aircraft cabin and the outside pressure may be necessary in the event of a very rapid descent of an aircraft to low altitudes, in which case the cabin pressure could become lower than the outside pressure.

Plate 43g effects such limitation, for when the outside static pressure becomes greater than the cabin pressure, check-valve 42 blocks the pipe means of low pressure circuit. Valve 39 for communicating the cabin with the low-pressure circuit opens to allow the cabin pressure to reach the servo-chamber 43. Through the outside pressure valve element 43b is lifted and the complete valve system is fully open for a difference of approximately 20 mb.

Considering next the matter of limiting a positive difference between the cabin pressure and the outside pressure, i.e. limiting the overpressure, safety is assured by the same means as those which operate for the isooverpressure function (such safeguard being operative only if the isooverpressure function fails) by means of the capsule 45 the setting of which is a few millibars above the setting of isooverpressure capsule 47.

In order to limit the difference between the cabin pressure and the outside pressure to the lowest possible value when the aircraft cabin is ventilated on the ground with its doors open, opening of the valve is effected at such time by mechanical means consisting precisely of said separate electric motor, reduction gear 46 and rack 46a. Under normal regulating conditions rack 46 is in its upward position and is formed on its base with a groove and on its other side with a long notch 46b bounded by two ramps. When the command is given to open a valve, the motor separate causes the rack to descend until the upper ramp contacts microswitch 53 fixed to valve 43a. Microswitch 53 energizes the latch 49 and thereby commands reversing of the rack motor, resulting in stoppage in the upward valve position through contact with the limit switch of said motor.

Reverting to the regulating position is instantaneous if the circuit energizing electromagnet 49 is broken, notably through the agency of a switch actuated through the relieving of the load on a landing-gear member.

The same components may be used for safety purposes in the event of alighting on the sea, in which case the command is applied to descent of the rack, which descent causes closure of valve 43b. The upper rack ramp of notch 46b may then command stoppage of the motor in that position while at the same time preventing the aforementioned reversal of the direction of rotation. The coupling between the motor and the rack 46a is preferably irreversible. The valve subjected to the water pressure remains closed, and this for a thrust capable of attaining a water head of one meter above the valve, for example.

From the technical standpoint, the following advantages are offered:

a. The overpressure regulator 40 regulates the low pressure ahead of jet 38 to 25 mb below the cabin pressure in order to ensure a rapid and constant response time of valve 43b irrespective of the pressure differential between the interior of the cabin and the surrounding atmosphere. There is also thereby obtained a constant valve amplification gain with satisfactory results for transient phases and small variations in cabin pressure, as well as simplification in the adjustment of the regulator.

b. The electromechanical system with the irreversible motor-reduction gear provides, first, the possibility of automatic opening and closure of valve 43b and, second, of latching the unit both for ground ventilation and, in any event latched closure in the case of an emergency alighting on water. Following ground ventilation, reverting to the regulating configuration is instantaneous. A system of this kind means that the valve is self-contained and dispenses with the need for negative-pressure generating ancillary equipment such as a vacuum pump or an extractor operating via a ram-air circuit.

c. Inductive sensor 18a permits accurate measuring of the valve position, notably by means of visual indicator 23, and further allows equalization and stabilization in cases where a plurality of valves in used, as well as linearization of the control action.

Considering next the electronic parts corresponding to the diagrams in FIGS. 1 and 2, it is preferable to have recourse to integrated-circuit type operational amplifiers by reason of their lightness, small size and great reliability.

Whereas regulation of the pressure within a chamber or an aircraft cabin requires that at least two parameters be known, namely the interior pressure and rate of variation thereof during changes affecting the outside pressure, in turn requiring in principle the use of at least two sensors, the device hereinbefore described allows the use of a single sensor formed by a single absolute capsule such as the frictionless membrane-type capsule 1 which measures only the interior cabin pressure, while the electronic auxiliaries deduce the other parameters from this measurement by suitable processing in the aforementioned electronic circuits.

Thus the rate of pressure variation, or the derivative of this pressure with respect to time, is elaborated in circuit 5 (FIG. 1). This rate is given in mean value in the circuit 6, which circuit has a time-constant of the order of six seconds, that is to say that very rapid variations are integrated therein together with variations over a certain time interval.

The second derivative of the pressure is formed in circuit 7 so as to constitute an anticipation term.

A fraction of the pressure value is added with the appropriate sign to the rate set into circuit 13, with one or more different thresholds, in order to achieve an approximation along straight-line segments of the curve plotting the rate of variation of the pressure against the derivative of that pressure. This provides a smoothing of the rate of variation of the pressure by a process of commuting and adding successive fractions of that pressure. These operations are accomplished with circuits 8 to 14 which furnish a corrected preset rate signal at the output of the adding and rate presetting adjustable potentiometric circuit 13.

The corrected preset rate is added algebraically to a mean value of the actual rate, which value is supplied by the circuit 6 at the input of summing amplifier 15, and the anticipation signal issuing from circuit 7 adds itself to the combination of these two functions to form the error signal at the output of circuit 15.

This error signal can drive one or more valve position repeater circuits, in which the rate of change of position, or the derivative of the position, is used as a damping term, which term is furnished by amplifier 24. The valve position repeater circuit is used also for smoothing and stabilizing the valve control action.

The inductive valve position sensors 18a (FIG. 2) or 18b (FIG. 3) deliver a position signal which modulates a carrier signal having a frequency of 400 Hz.

Following impedance matching in circuit 19, the signal is demodulated in circuit 20. This modulation is smoothed in circuit 21 by low-pass filtering for subsequent injection into the summing amplifier 27 which generates a sum of the various signals and amplifies them. The sum signal is amplified in circuit 28 to provide a control signal.

As shown in FIG. 3, this control signal is used directly in a two-phase motor, in a different manner, with pneumatic damping by the torque motor 29 of FIG. 4.

Whereas in the above exemplary embodiments a control circuit has been described as controlling a single valve, it will of course be understood that such control could be associated to a plurality of valves which could be identical or different in respect of their throughput characteristics as well as their design and operating mode. Similarly, a single measuring and error-signal generating circuit could be associated to as many valve position control and repeater circuits and control-signal-utilizing power circuits as there are valves.

Clearly also, many changes and substitutions of parts could be made in the forms of embodiment described hereinabove without departing from the scope of the invention as defined in the appended claims.

What I claim is:

1. A method of regulating the absolute pressure and the speed of variation of said absolute pressure of a compressible fluid inside a chamber continuously supplied with compressible fluid under pressure by conventional means, said chamber being placed in an atmosphere in which the pressure is liable to vary and communicating with said atmosphere by a regulated valve, comprising, in combination, the steps of measuring the pressure within said chamber with a single sensor deprived of mechanical friction providing an electrical translation of the value of said measured pressure, electronically processing said translation thereby to generate an error signal, of electronically summing said error signal with a signal translating the position of said valve for generating a control signal, and applying said control signal to a motor for actuating at least one associated valve for controlling communication between the interior of said chamber and said outside atmosphere.

2. In a method as claimed in claim 1 the steps of electronically effecting a algebraic sum of three signals in direct relationship, respectively, firstly with an averaged value of the rate of change of the measured pressure, secondly with the value of the acceleration in the rate of change of said measured pressure comprising the second derivative of measured pressure signal, and thirdly with a preset rate of variation value, subsequent to a correction dependent on the actual internal pressure and upon a preset pressure, whereby to resultantly generate said error signal.

3. A method as claimed in claim 2, wherein said signal in direct relationship with said measured pressure is subjected to two successive electronic differentiations, of which one supplies the rate of change of said measured pressure and the other the acceleration of said rate of change.

4. A method as claimed in claim 3, wherein said signal in direct relationship with the value of the acceleration in the rate of change of said measured pressure is used as an anticipation term in generating said error signal.

5. A method as claimed in claim 4, wherein said signal in direct relationship with the value of the measured pressure is subjected in succession to an electronic differentiation and to an electronic integration of its rapid variations, thereby to generate a signal in direct relationship with an averaged value of said rate of change of said measured pressure.

6. A method as claimed in claim 5, wherein a signal in direct relationship with a preset pressure is compared electronically with said signal in direct relationship with said measured pressure whereby to generate a corrected signal for the rate of variation of the preset absolute pressure, said comparison determining an algebraic addition of a portion of said signal in direct relationship with said measured pressure to said preset rate of absolute pressure variation signal, whereby the function represented by said corrected signal is linearized in absolute pressure.

7. A method as claimed in claim 6, wherein a single error signal is summed electronically with a plurality of signals each in direct relationship with the position of an associated valve.

8. A method as claimed in claim 7, wherein each signal for controlling an associated valve is generated by the electronic algebraic summing of an error signal, a signal in direct relationship with the position of said valve, to which signal are integrated its rapid variations, a signal in direct relationship with the derivative of the position of said valve, used as a damping term, and a signal in direct relationship with the derivative of said control signal, likewise used as a damping term, the whole in an electronic valve position repeater circuit driven by said error signal.

9. In a method as claimed in claim 8, a signal in direct relationship with the valve position generated by a inductive sensor deprived of mechanical friction mechanically connected to said associated valve.

10. A device for regulating the pressure of a compressible fluid inside a chamber continuously supplied with fluid under pressure by conventional means, said chamber being placed in an atmosphere the pressure of which is liable to vary and being provided with at least one valve for controlling communication between the interior of said chamber and said atmosphere, comprising, in combination, a single sensor for sensing the internal pressure of said chamber, an electronic measuring and error signal generating circuit electrically connected to said sensor, to an electronic circuit for generating a signal repeating the position of said valve and a corresponding control signal for positioning the same, to an electronic power circuit and to a motor electrically connected to said power circuit and mechanically connected to the moving element of said valve.

11. In a device as claimed in claim 10, a sensor deprived of mechanical friction mechanically connected to its valve and delivering an electric signal indicative of the position thereof, said signal being utilized in a servo-ring for recopy of said position.

12. In a device as claimed in claim 10, an electric motor which has a control winding receiving said control signal and which is mechanically connected to the moving valve element, and an associated sensor of the position of said valve element.

13. In a device as claimed in claim 10, a valve provided with pneumatic servo-control means operatively connected to an electric torque motor receiving said control signals, a low pressure circuit comprising means for generating said low pressure pneumatically linked to said servo-control means, said generating means substracting a constant pressure value from the pressure value inside said chamber cabin, and means adjusted by said torque motor for applying said low pressure to the movable valve element.

14. In a device as claimed in claim 13, drive means for imperatively controlling valve opening and instant return of the valve to the regulating conditions through controlled release of said drive means from said movable valve element, and means for controlling imperative closure of said valve and latching thereof by virtue of the irreversibility of the action thereof.

* * * * *